Sept. 15, 1953
B. B. BAUER
2,652,260
IMPROVED PHONOGRAPH PICKUP APPARATUS
Filed Aug. 30, 1947
2 Sheets-Sheet 1

INVENTOR.
Benjamin B. Bauer
BY
Thiess, Olson & Mecklenburger
Attorneys

Sept. 15, 1953

B. B. BAUER 2,652,260

IMPROVED PHONOGRAPH PICKUP APPARATUS

Filed Aug. 30, 1947

2 Sheets-Sheet 2

INVENTOR
Benjamin B. Bauer
BY
Thiess, Olson + Mecklenburger
Attys

Patented Sept. 15, 1953

2,652,260

UNITED STATES PATENT OFFICE 2,652,260

IMPROVED PHONOGRAPH PICKUP APPARATUS

Benjamin B. Bauer, Oak Park, Ill., assignor to Shure Brothers, Incorporated, Chicago, Ill., a corporation of Illinois Application August 30, 1947, Serial No. 771,433

4 Claims. (Cl. 274—37)

This application relates to phonograph translating devices, more particularly to such apparatus for reproducing sound from records, and it is an object of the invention to provide improved apparatus of this character.

Phonograph translating devices for reproducing sound from records, termed pickups, frequently are in the form of cartridges which comprise a casing having a translating element and a coupling structure therein. Terminals in the form of prongs connected to the translating element extend from one end of the casing for easy and rapid insertion into corresponding sockets in the phonograph tone arm. A record engaging needle or stylus is arranged to project through the casing adjacent the other end for following record grooves, the stylus being attachable to the coupling structure by means of a screw, for example, usually also projecting from the casing where it is engageable by hand or with a tool. The coupling serves to transmit mechanical movements or some function thereof from the stylus to the translating element, and the translating element serves to convert the transmitted mechanical movements into electrical variations which are transmitted through the cartridge terminals to the phonograph amplifier or other reproducing device. For high quality reproduction, the sound output from the phonograph should be substantially free from extraneous noises such as needle and record talk, and needle hiss, the former being sounds radiated directly to the atmosphere because of the vibrations of the stylus, the coupling structure, and the record itself, and the latter being sounds caused by surface imperfections of the record and may pass through the pickup and phonograph.

Accordingly, it is a further object of the invention to provide a pickup embodying improved stylus and coupling structure whereby extraneous noise due thereto is reduced to a minimum.

The width of the groove in phonograph records varies, and when the width decreases, a component of force upward is produced on the stylus and the pickup in general. This effect may cause fluctuations of the stylus in the groove which is undesirable in high quality reproduction, and it is a further object of the invention to provide an improved stylus having vertical compliance or resilience whereby extraneous noises due to such effects are substantially prevented from reaching the translating element.

In pickups of the general character described, the translating element frequently comprises a piezoelectric crystal made so that movements of the pickup stylus produce distortions thereof for giving an electrical output. The pickup stylus may be connected to the crystal through the medium of a torsion member wherein the torsion member is axially arranged relative to the crystal and the stylus is at an angle to the torsion member which includes an axial screw for holding the stylus thereto. In such constructions, whenever the screw is loosened or tightened to remove a stylus or replace one, a relatively strong torsional force is exerted on the torsion member and hence on the crystal. Resultant large strains may be produced in the crystal with consequent possible breakage, or if the apparatus is in operation, it at least causes undesirable and disagreeable noise to be received through the speaker.

Accordingly, it is a further object of the invention to provide improved stylus holding structure in a phonograph translating device wherein undesirable and injurious effects caused by removal or replacement of a stylus are substantially prevented.

In pickups according to the invention, a torsion member is arranged internally of the casing and an arm or stud, which extends through the casing substantially at right angles thereto, is relatively permanently attached to the torsion member. The stylus or needle is removably attachable to the lower end of the stud, the stylus being a relatively fine wire or rod-like member which is stiffer in the horizontal direction than in the vertical direction. The stud has a hole at its lower end into which one end of the stylus is relatively easily receivable.

It is a further object of the invention to provide improved structure for aligning the stylus in its holder.

It is a further object of the invention to provide improved structure for preventing injury to the stylus point when the pickup forcibly comes into contact with the record and to prevent deflection of the stylus beyond a predetermined amount.

In carrying out the invention in one form, a phonograph translating device is provided comprising the combination of, a resiliently mounted torsion member, an arm rigidly and relatively permanently attached at one end to said torsion member and extending substantially at right angles to the axis thereof, said arm including a hole extending parallel to the axis of said torsion member at its other end, a stylus relatively easily receivable in said hole, and removable means for holding said stylus to said arm.

For a more complete understanding of the invention, reference should be had to the accompanying drawing in which.

Figure 1:
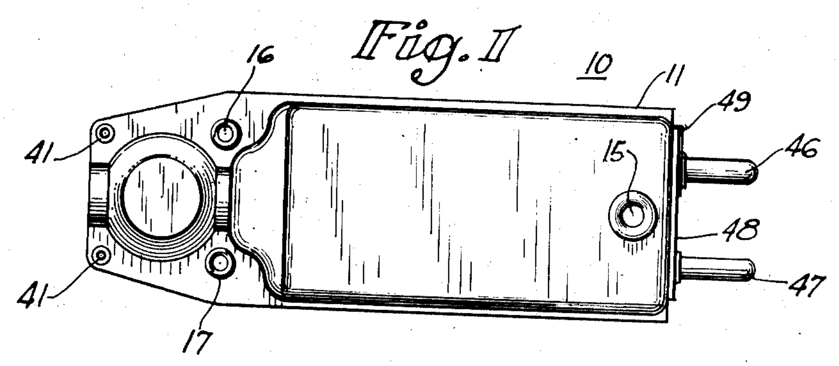
Fig. 1 is a top plan view of a pickup embodying the invention.
Figure 2:
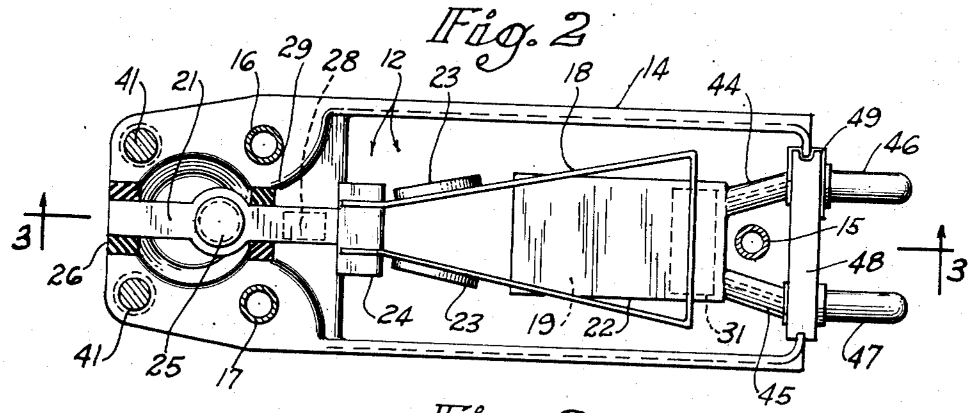
Fig. 2 is a top plan view on a larger scale of the pickup shown in Fig. 1 with the top cover removed.

Referring more particularly to the drawing, the invention is shown embodied in a phonograph pickup 10 comprising a casing 11 and a translating assembly 12 inside thereof. Casing 11 comprises complementary top and bottom members 13 and 14 respectively, these members being formed by any well known process, such for example as by stamping or casting, and may be made of any material, such for example as brass, aluminum or plastic. As shown, casing members 13 and 14 are substantially identical with each other, are rectangular in outline, and when placed together form essentially a forward compartment and a rearward compartment which contain different portions of the translating assembly 12, holes being provided through the casing members whereby rivets 15, 16 and 17 may be inserted for holding the pickup in assembled relation.

Translating assembly 12 comprises a frame 18, a piezoelectric element 19, such as a Rochelle salt crystal, and a coupling structure including torsion member 21 connected to frame 18. The frame 18 is generally trapezoidal in outline, may be formed from a flat piece of material bent into the configuration shown, and is provided with three openings, these being respectively at the rear of the frame and along each side. Crystal 19, which may be sealed from the atmosphere by a protective coating 22, is held within the openings in frame 18 by any well known means, such for example as cement, the two side members of frame 18 being movable relative to each other whereby to distort the crystal and consequently produce an electrical output. Welded to the front ends of the frame members are a pair of weights 23 for predetermining desirable vibration characteristics of the frame and the cooperating structure.

While the active element of the translating assembly 12 as been shown as a piezoelectric element 19, it will be understood that this is exemplary only and that other suitable transducing elements, such for example as magnetic units, condenser units or photoelectric units, may be used.

The torsion member 21 is a relatively stiff member and is T-shaped in outline, the T end thereof being received between prongs on the front ends of the side members of frame 18. A rubber spacer 24 is placed between the end of torsion member 21 and the prongs whereby the coupling between frame 18 and torsion member 21 is resilient. Hence, the movements of torsion member 21 are transmitted to frame 18 and crystal 19 with decreased amplitude, relatively speaking. This is done because of the fact that the crystal may be very stiff and distortions of relatively smaller amplitude may be desirable.

The mechanism for transmitting motion to the piezoelectric element 19, including the frame 18, is described fully and claimed in Bauer United States Patent 2,513,269. In the forward compartment of casing 11 a downwardly projecting stud 25 is rigidly attached to torsion member 21 to form part of the coupling mechanism. As shown, the stud is attached to the torsion member by riveting over, but this is by way of example only since other well known means may be used. The stud is made of some light metal, for example aluminum, in order that the inertia of the coupling mechanism may be kept at a minimum. It projects through an opening provided in the bottom member 14 of the casing.

A pair of resilient rubber bearing members 26 and 27 support torsion member 21 within the casing 11, the bearing members being held within the forward portion of the casing by journals formed by indenting the casing material as shown. Due to the rubber bearings or washers, the torsion member may have slight movements both vertical as well as horizontal, and its rotational movements are resiliently resisted, this being enhanced by the fact that torsion member 21 may be rectangular in cross section and therefore have a firm grip within the rubber bearings.

Forwardly of the rearward chamber there are a pair of damping members 28 and 29 lying one on each side of the torsion member and bearing against the inside of the housing members 13 and 14. Damping members 28 and 29 may be formed of substances known as elastomers, which substances have some resilience as well as the ability to absorb energy and thus supply some restoring force to torsion member 21 in addition to damping undesirable resonances thereof. At the rear of frame 18 there are a pair of support members or pads 31 and 32 formed of resilient substances such as elastomers whereby to resiliently support frame 18 and at the same time provide damping for undesirable resonances. The members 28, 29, 31 and 32 may, for example, be made of Du Pont Pyralin, Type X-2450.

Figures 3, 4, 5, 6:
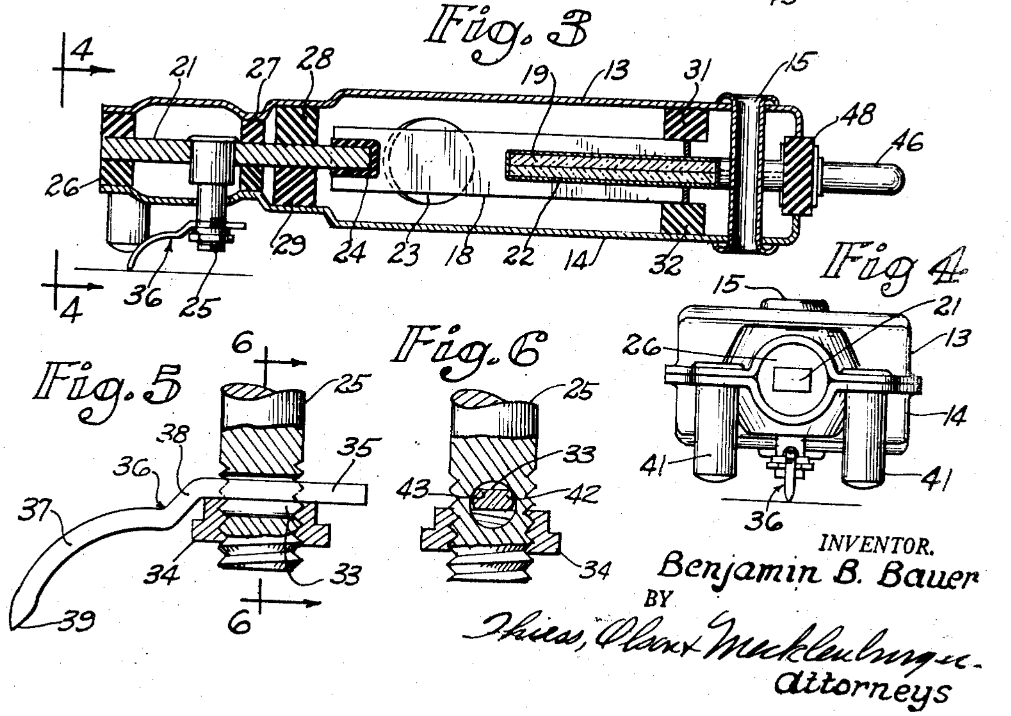
Fig. 3 is a sectional view taken substantially along lines 3—3 of Fig. 2 with the top cover in place.
Fig. 4 is an end elevational view taken substantially in the direction of arrows 4—4 of Fig. 3.
Fig. 5 is a fragmentary view of Fig. 3 on a larger scale partially in section and partially broken away.
Fig. 6 is a view partially in section and partially broken away taken substantially in the direction of arrows 6—6 of Fig. 5.

Referring to Figs. 5 and 6, the stud 25 is provided with a hole 33 adjacent its lower end, which end is threaded to receive a nut 34. Nut 34 may be slotted or hexagonal, for example, for tightening with a wrench or it may be knurled, for example, for tightening with the fingers. Extending through hole 33 is the shank 35 of a record engaging stylus or needle 36.

The stylus 36 includes a curved portion 37 extending from shank 35 through an offset portion 38 and terminates in a record engaging point 39. The stylus cross section is generally uniform and is substantially rectangular with a horizontal dimension considerably greater than the vertical dimension so that the stylus is vertically resilient and laterally stiff. The curved portion 37 renders the stylus even more rigid laterally so that lateral movements of the point 39, when following a record groove, are transmitted virtually directly to the stud 25 without lateral distortion or bending of the stylus along its length. The stylus may be formed of any suitable material, such for example as carbon steel, and may be formed by stamping from a round wire. The point 39 may be of hardened steel forming a direct part of the stylus material or it may be a hard point such as sapphire or diamond attached to the stylus.

When vertical forces are exerted downwardly on stud 25 and stylus 36, the curved portion 37 thereof bends somewhat along its length, but the major portion of the deflection or bending takes place adjacent the offsetting portion 38. Small vertical movements, such as due to the pinch effect already referred to, are taken account of by the vertical resilience of the stylus. When, however, substantially larger forces are exerted on the point 39, these occurring for instance when the tone arm is dropped onto the record, it is desirable that deflections of the stylus beyond a predetermined amount be prevented in order not to exceed the elastic limit of the stylus as well as to prevent injury to the point. This is accomplished by the provision of tusks 41 on each side of point 39 and terminating a short distance thereabove, the tusks being rigidly attached to the casing 11. When the stylus deflects due to large forces exerted thereon, the lower ends of the tusks come into contact with the record surface and thereby prevent deflection of the stylus beyond a predetermined amount.

In order to be able to align stylus 36 properly without the need of exercising unusual skill, the construction of the lower end of stud 25, nut 34, and shank 35 are such that the shank 35 may be inserted within hole 33 and the nut 34 tightened with the assurance that the stylus will be in the optimum position. According to the invention, this is accomplished in one manner by forming hole 33, such as by drilling, with its axis parallel to the axis of torsion member 21. The shank 35, being relatively rectangular in cross section, has two upper edges 42 and 43 which engage the surface of hole 33 along lines which also are parallel to the axis of the torsion member. The underside of shank 35 is flat and the upper surface of nut 34 is flat. Moreover, the axis of stud 25 and that of nut 34 is at right angles to the axis of torsion member 21. The upper surface of nut 34, in addition to being flat, is also at right angles to the axis of stud 25. Accordingly, when nut 34 is tightened against the flat undersurface of shank 35, the upper edges 42 and 43 thereof are forced against the upper surface of hole 33. Since the axis of hole 33 is parallel to the axis of torsion member 21, the shank 35 of the stylus is held parallel to the axis of the torsion member, and since the coacting surfaces of nut 34 and shank 35 are flat, the stylus is held to lie substantially in a vertical plane containing the axis of the torsion member, and consequently the point 39 is maintained in the proper position for engaging the record surface.

The axis of stud 25 being at right angles to that of the torsion member, tightening the nut 34 to hold the stylus tends to produce only lateral forces upon the end of torsion member 21 connected to frame 18, and not rotational forces exerted about its axis. Distortions of frame 18 are thus lacking when nut 34 is being tightened, and consequently no distortions of crystal 19 occur. Hence there is no disagreeable noise produced in an operating phonograph when the stylus is being changed and there is no danger of applying damaging forces to the crystal.

The offset portion 38, in addition to providing desired vertical resilience for the stylus, by coming up against nut 34 prevents shank 35 from being pushed through hole 33 beyond the optimum point. Hence, the position of the needle in hole 33, both as to its position lengthwise of the pickup and its proper position for playing a record, is automatically taken account of.

When the pickup is in use, the point 39 of the stylus engages the groove of the record and the lateral undulations thereof are transmitted by means of the stylus and stud to torsion member 21. Rotations of the torsion member effect distortions of frame 18 and consequent distortions of crystal 19 to produce output as already described.

The stylus 36 is a small light member, its transverse dimension for example being of the order of .03 inch, and the weight of stud 25 may be made small through the use of lightweight material. Thus, the rotational moment of inertia introduced by the stud 25 and stylus 36 may be kept small. The maximum transverse dimensions of the torsion member 21 also being made small, the rotational moment of inertia introduced by this portion of the coupling system is also small. Accordingly, the total moment of inertia may be kept relatively small and transverse movements of the point 39 are transmitted relatively faithfully to crystal 19. Large amplitudes of vibration at natural frequencies caused by the resilience of stylus 36 and the mass of stud 25 and torsion member 21 are largely damped out through the use of the damping members 28 and 29.

The output of crystal 19 is carried by means of conductors inside of shields 44 and 45 to prongs 46 and 47 for conduction to the phonograph amplifier, the prongs being supported in an insulating member 48 forming a closure for the rear end of casing 11. Prong 46 is grounded to casing 11 by the conducting strip 49.

Figures 7, 8, 9, 10, 11, 12:
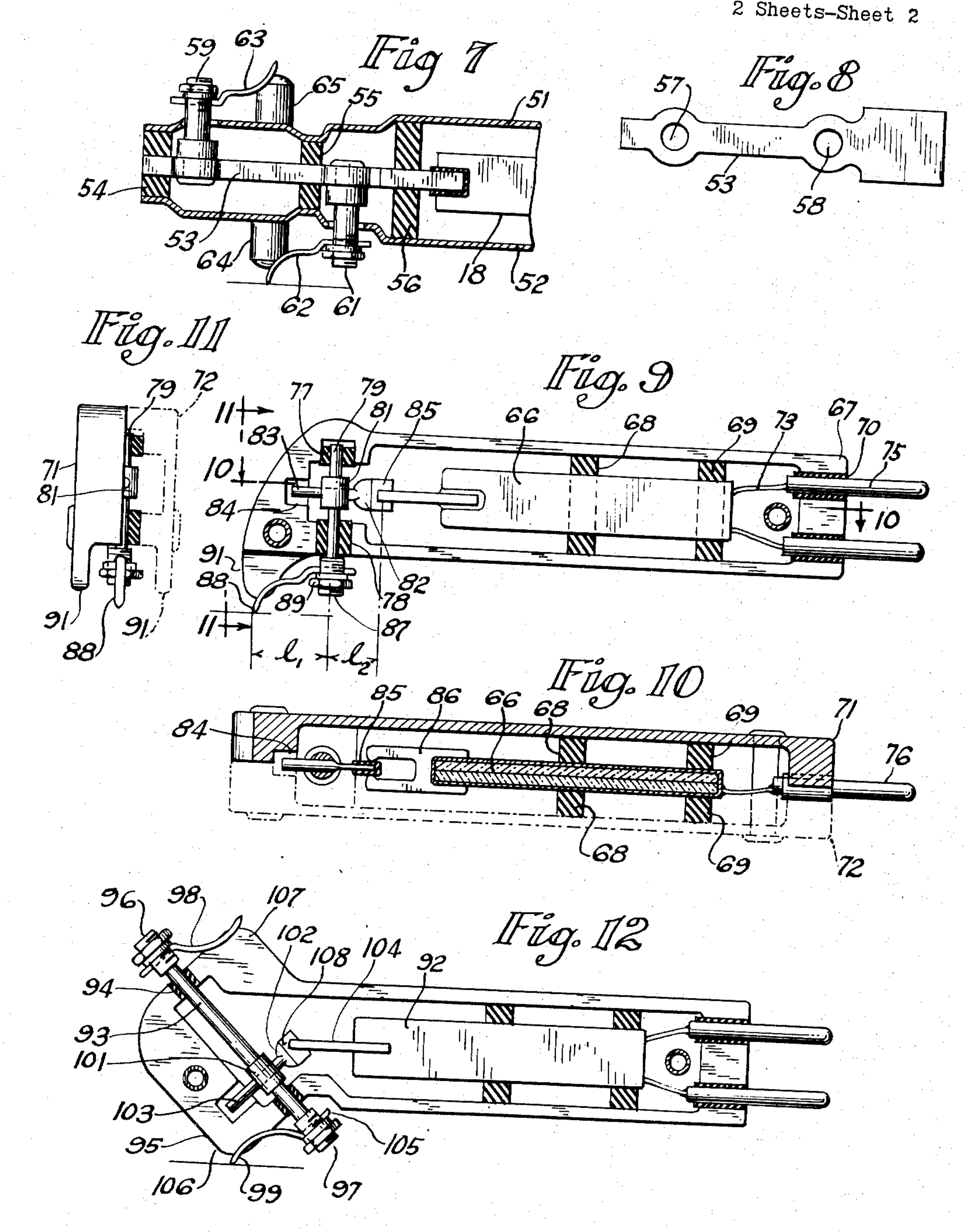
Fig. 7 is a sectional view similar to Fig. 3 of a modified form of the invention.
Fig. 8 is a top plan view of the torsion member shown in Fig. 7.
Fig. 9 is a vertical sectional view of a further embodiment of the invention.
Fig. 10 is a horizontal sectional view taken substantially along lines 10—10 of Fig. 9.
Fig. 11 is a front elevational view taken substantially in the direction of arrows 11—11 of Fig. 9.
Fig. 12 is a vertical sectional view of a further embodiment of the invention.

The embodiment of the invention shown in Fig. 7 is adapted for use in phonograph constructions wherein both sides of a pickup may be used. The arrangement of the parts is similar to that in the previous embodiments and it includes a frame member 18 for supporting a crystal as described, the casing comprising a pair of half members 51 and 52 which are somewhat longer in order to support the torsion member 53. The torsion member is supported in the forward end of casing members 51 and 52 by means of rubber or elastomer pads 54, 55 and 56 which serve to dampen undesired vibrations thereof and provide some restoring force therefor. Torsion member 53 may be of any suitable shape and is shown as a relatively rectangular member having a pair of openings 57 and 58 spaced apart to receive studs 59 and 61 respectively, the studs being attached thereto relatively permanently such as by riveting, and extending perpendicularly outwardly from opposite sides of the torsion member.

Openings are provided in the sides of casing members 51 and 52 through which studs 59 and 61 project, these openings being sufficiently large whereby rotational movements of torsion member 53 may take place with suitable amplitudes without having the studs contact the casing.

Styluses 62 and 63, as already described, are attached to the studs 61 and 59 in a manner as already described. Stylus 62 projects forwardly of stud 61 and stylus 63 projects rearwardly of stud 59 in order that the stylus points may lie in a line perpendicular to the axis of torsion member 53 whereby maximum tracking angle correction may be obtained with both styluses.

Pairs of tusks 64 and 65 are attached to the casing such as by riveting, for example, and are placed in position substantially in line transversely with the stylus points so that excessive movements of the pickup either upward or downward are prevented by the tusks coming into contact with the records.

While in the foregoing embodiments of the invention the crystal was subjected to twisting stresses through the use of a torsion member rotated by the stylus, the stylus construction and the manner of attaching it to the pickup of my invention present a convenient manner of constructing a pickup in which the crystal or other transducing member is placed under bending stresses. Such constructions are shown in Figs. 9, 10, 11 and 12.

In the modification shown in Figs. 9, 10 and 11, a crystal 66 is supported within a casing 67 by pairs of resilient pads 68 and 69 made of rubber or an elastomer, the pads 69 being substantially at the rear of the crystal and the pads 68 being in between the rear and forward ends of the crystal. Casing 67 may be made of any suitable material such for example as metal or plastic and consists of a pair of halves 71 and 72 held together by rivets, for example. Leads 73 and 74 extending from the crystal are connected respectively to prongs or studs 75 and 76 by means of which the voltage impulses from the crystal are transmitted to the phonograph amplifying apparatus. Suitable openings are provided in the casing and insulating members 70 are arranged therein for supporting studs 75 and 76. The structure for placing crystal 66 under bending stress is arranged at the end of the pickup opposite to studs 75 and 76, and the supporting pad 68 is arranged at an intermediate portion of the crystal in order that the forward extremity may be bent back and forth.

At the extreme forward end of the pickup the casing halves are provided with suitable openings in which may be received resilient supporting members 77 and 78, the axis of these members and openings extending vertically. Centrally held within resilient members 77 and 78 is a vertical rod 79 having an enlarged portion 81 substantially at its center. The lower end of rod 79 extends outwardly of the pickup and is adapted to have a stylus attached thereto as will be explained hereinafter. A hole is drilled through portion 81 and a driving member or paddle 82 is pushed therethrough so that its forward end 83 extends into a recess 84 provided in the pickup casing. The rear end of paddle 82 consists of a flattened portion surrounding which a resilient spacer 85 is placed. A connecting link 86 is bifurcated at each end in order that it may grip paddle 82 and spacer 85 and at the same time grip the forward end of crystal 66.

It will be apparent from this construction that whenever rod 79 is rotated about its axis, paddle 82 is rotated and moves the end of crystal 66 sidewise back and forth with it. Spacer 85 absorbs some undesirable vibrations and cushions shocks.

At the lower end of rod 79 projecting outwardly of the casing, an enlarged portion 87 is provided which is threaded and which has a hole drilled therethrough in a manner hereinbefore described.

Stylus 88, which is similar to the styluses already described, is placed within the hole in the enlarged portion 87, and a nut 89 holds the stylus to the stud in a manner already described. When the point of stylus 88 engages a record having lateral grooves therein, the end of the stylus moves sidewise and accordingly causes rod 79 to rotate back and forth, this rotational movement placing the crystal under bending stresses.

Connecting link 86 may be shifted lengthwise thereof into different positions relative to the axis of rod 79 thereby changing the distance $l_2$, that is, the distance from the axis of rod 79 to the point where link 86 engages the paddle. Changing the distance $l_2$ relative to the distance $l_1$, i. e. the distance from the axis of rod 79 to the point of the stylus 88, varies the leverage exerted by the stylus and thereby greater or lesser bending forces may be applied to the crystal, as desired. In addition to the strong bending force obtained by this construction, the effective mass and stiffness is reduced, i. e. by the ratio $$\left\{\frac{l_2}{l_1}\right\}^2$$

This is advantageous in that a more faithful response is produced in the crystal output.

The rod 79 rotating around its vertical axis, its effective moment of inertia is small and the contribution of its mass to the mass as the stylus point is therefore small. In this manner, a pickup is produced which has high compliance and good output and yet one which has an extremely small needle mass and stiffness.

In order that excessive bending movements of rods 79 may not injure crystal 66, the recess 84 in the forward end of the crystal is so constructed that the forward end 83 of paddle 82 engages the sides of recess 84 whenever the desired limits of movement are exceeded.

Stylus 88 is prevented from being injured by excessive vertical movements by studs or prongs 91 extending downwardly from the forward end of the casing along each side of the stylus as may be seen best in Fig. 11.

The embodiment of Fig. 12 is similar in its general arrangement to the embodiment of Figs. 9, 10 and 11, and differs therefrom mainly in that the construction is such that the pickup may be used for two-sided operation. To this end crystal 92 is supported inside of a casing comprising a pair of members. At the forward end of the pickup casing, a shaft 93 is arranged to be supported in suitable openings by means of resilient bearing members 94 and 95. Each end of the rod or shaft 93 projects outwardly of the casing and includes respectively enlarged portions 96 and 97 which are threaded and have holes drilled therein to receive styluses 98 and 99 in a manner as hereinbefore described.

The angular position of shaft 93 is made such that when two identical styluses 98 and 99 are used, the points thereof lie in a line perpendicular to the horizontal axis of the pickup, this being advantageous in order that the same relative point in a record may be engaged by either stylus irrespective of which side of the pickup is being used.

Intermediate the ends of rod 93 there is an enlarged portion 101 through which a hole extends to receive a paddle 102, the paddle having a forward end 103 received in a suitable recess in the casing to prevent excessive movements of rod 93. The rear end of paddle 102 is covered with a piece of spacing material 108 and is connected to crystal 92 by means of a bifurcated member 104.

Accordingly, it will be seen that lateral movement of styluses 98 and 99 effect a rotational movement of shaft 93 and paddle 102, thereby placing crystal 92 under bending stresses.

The styluses 98 and 99 differ somewhat from the styluses previously described inasmuch as these styluses are held in rod 93 which extends at an acute angle relative to the axis of the pickup rather than at right angles thereto. Secondly, the rear or attaching portion 105 of the styluses is bent upwardly at an angle relative to the forward or curved portion. The curved portions of styluses 98 and 99 are similar to the curved forward portions of the previously described styluses, the only difference being in bending the rearward portion so that the styluses will assume proper positions.

The upper and lower members of the casing are also provided with projecting members 106 and 107 on each side of the styluses to prevent excessive vertical movement thereof.

Claims directed primarily to the stylus disclosed herein have been divided from this case and are being asserted in copending application Serial No. 90,688, filed April 30, 1949, now Patent No. 2,583,289, issued January 22, 1952, and claims directed to the coupling arrangement between the stylus and the transducing means disclosed herein have been divided from this case and are being asserted in copending application Serial No. 90,687, filed April 30, 1949.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

Having thus described the invention, what is claimed and desired to be secured by Letters Patent is:

1. In a transducing device for use with a phonograph record, a transducing member, a driving member coupled to said transducing member, bearing means for mounting said driving member for angular oscillation about an axis generally parallel to the record surface in the normal operating position, an arm fixed to said driving member and extending from said driving member transversely with respect to said axis and toward said record surface, said arm having an opening extending transversely therethrough at a portion thereof remote from said driving member, a stylus insertable and removable in said opening, said stylus having portions extending beyond said arm on both sides thereof, and a clamping member mounted exteriorly on said remote portion of said arm and being movable axially of said arm into clamping engagement with said extending portions of said stylus to exert a clamping force thereagainst in a direction parallel to the axis of said arm.

2. In a mechano-electric transducer for use with a phonograph record, a transducing member, a driving member coupled to said transducing member, bearing means for mounting said driving member for angular oscillation about an axis generally parallel to the record surface in the normal operating position, an arm fixed to said driving member and extending from said driving member transversely with respect to said axis and toward said record surface, said arm having an opening therein extending transversely of said arm at a portion thereof remote from said driving member, a stylus insertable and removable in said opening, a clamping member in threaded engagement with said remote portion of said arm and being screwable lengthwise from the remote portion of said arm into clamping engagement with said stylus in said opening.

3. In a mechano-electric transducer for use with a phonograph record, a transducing member, a driving member coupled to said transducing member, bearing means for mounting said driving member for angular oscillation about an axis generally parallel to the record surface in the normal operating position, an arm fixed to said driving member and extending from said driving member transversely with respect to said axis and toward said record surface, said arm having an opening therein extending transversely thereof at a portion thereof remote from said driving member, a stylus insertable and removable in said opening, said stylus having a portion which, when the stylus is inserted in said opening, extends transversely beyond said arm, and a clamping member in threaded engagement with said remote portion of said arm and being screwable lengthwise of said arm into clamping engagement with said extending portion of the stylus when the stylus is in said opening to exert a clamping force thereagainst in a direction parallel to the axis of said arm, said stylus and said clamping member having flat surfaces in cooperative relation to each other whereby the orientation of said stylus in said opening is fixed.

4. In a pickup of the replaceable stylus type for use with a phonograph record, a transducing member, a driving member coupled to said transducing member, means for mounting said driving member for angular oscillation about an axis generally parallel to the record surface in the normal operating position, an arm fixed to said driving member and extending from said driving member transversely with respect to said axis and toward said record, said arm having a threaded end portion, said end portion having an opening therein extending transversely thereof, a replaceable stylus comprising a record-engaging point, a point-carrying portion, a shank portion of generally flattened cross-section connected to said point-carrying portion and a stop on said shank portion for positioning said stylus lengthwise in said opening, with the point of the stylus a predetermined distance laterally of the axis of said arm, and a clamping member having a threaded engagement with said threaded end portion for clamping said shank in said opening, said point-carrying portion extending generally obliquely with respect to said shank portion and toward the record, said clamping member bearing against one of the flattened sides of said shank portion.

BENJAMIN B. BAUER.

References Cited in the file of this patent

UNITED STATES PATENTS

| Number | Name | Date |
|---|---|---|
| 624,625 | Clark et al. | May 9, 1899 |
| 1,652,191 | Withers | Dec. 13, 1927 |
| 2,197,967 | Dally | Apr. 23, 1940 |
| 2,227,574 | Greager | Jan. 7, 1941 |
| 2,280,763 | Hasbrouck | Apr. 21, 1942 |
| 2,320,416 | Dally | June 1, 1943 |
| 2,326,460 | Hasbrouck | Aug. 10, 1943 |
| 2,356,810 | Bauer | Aug. 29, 1944 |
| 2,474,993 | Tibbetts | July 5, 1949 |
| 2,479,894 | Andrews | Aug. 23, 1949 |
| 2,511,663 | Bachman | June 13, 1950 |
| 2,601,988 | Chorpening et al. | July 1, 1952 |